March 2, 1965   W. E. DIETRICH, JR   3,171,206
MANUAL CURVE TRACER
Original Filed May 15, 1958   5 Sheets-Sheet 1

INVENTOR.
WALLACE E. DIETRICH, JR.
BY
ATTY.

March 2, 1965     W. E. DIETRICH, JR     3,171,206
MANUAL CURVE TRACER
Original Filed May 15, 1958     5 Sheets-Sheet 2
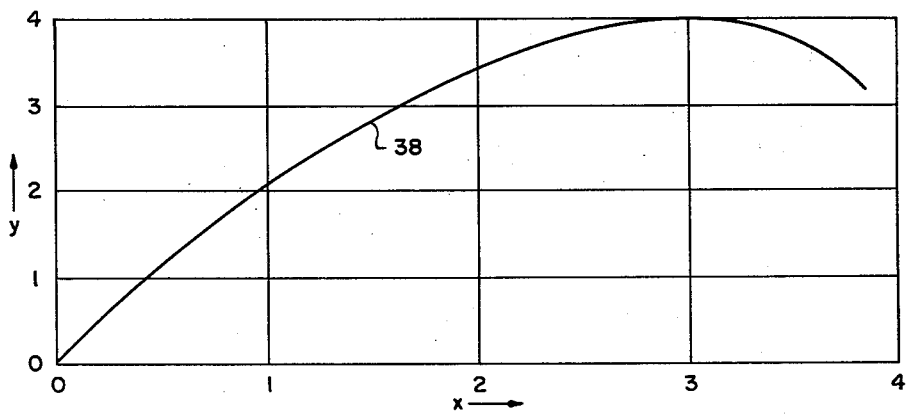
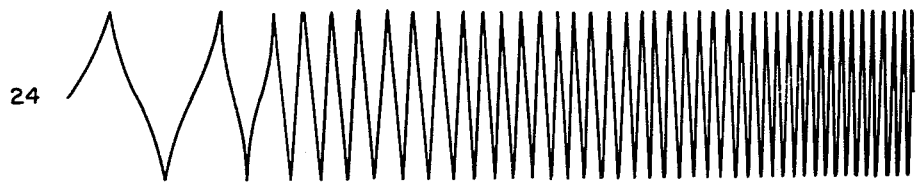
FIG. 2.
INVENTOR.
WALLACE E. DIETRICH, JR.
BY
ATTY.

INVENTOR.
WALLACE E. DIETRICH, JR.

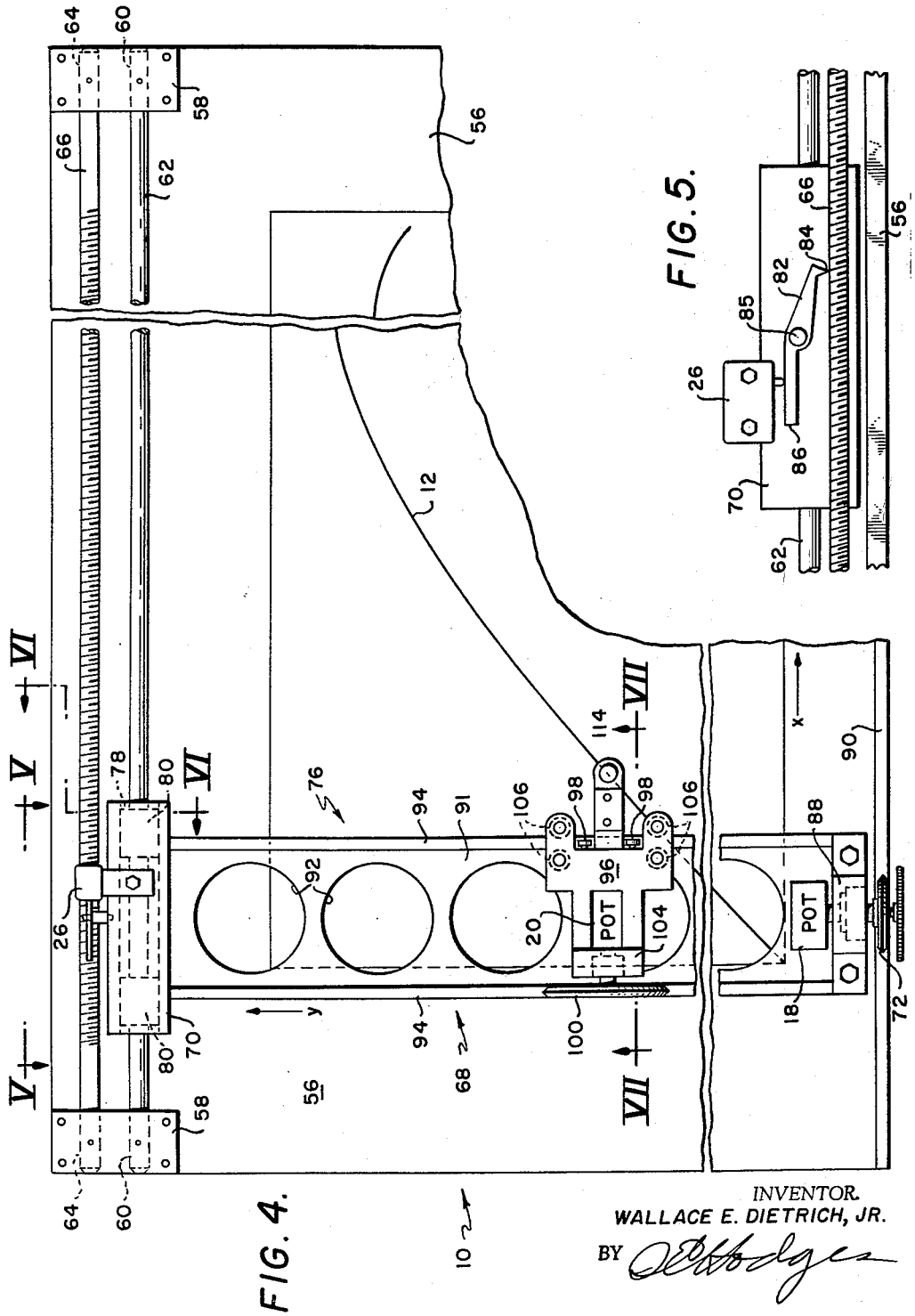

March 2, 1965  W. E. DIETRICH, JR  3,171,206
MANUAL CURVE TRACER

Original Filed May 15, 1958  5 Sheets-Sheet 5

INVENTOR.
WALLACE E. DIETRICH, JR
BY
ATTY.

United States Patent Office 3,171,206
Patented Mar. 2, 1965

3,171,206
MANUAL CURVE TRACER
Wallace E. Dietrich, Jr., Baltimore, Md., assignor to the United States of America as represented by the Secretary of the Navy
Original application May 15, 1958, Ser. No. 735,653. Divided and this application Jan. 31, 1963, Ser. No. 266,771
1 Claim. (Cl. 33—1)
(Granted under Title 35, U.S. Code (1952), sec. 266)

The present application is a divisional application of co-pending application Serial No. 735,653, filed May 15, 1958, for Digitized Analog Computer.

The invention described herein may be manufactured and used by or for the Government of the United States of America for governmental purposes without the payment of any royalties thereon or therefor.

This invention relates to a digitized analog computer for measuring and calculating the characteristics of various curves and shapes, such as ship hulls, for volume and stability values.

The invention comprises a curve tracer for physically tracing an arbitrary curve on a sheet of paper, a means connected to the curve tracer for generating a plurality of outputs proportional to the value of the curve along a pair of right-angled axes, and a means for calculating the desired characteristics of the curve such as the area or the moment of area with respect to any axis. In addition, the slope of the curve may be obtained by differentiation.

The invention also embodies a novel method for calculating the product of several quantities, which quantities need not be related. Complex computation may be performed with the addition of suitable memory devices.

In the past, analog and digital computers have been used to calculate these areas and products, but have had numerous disadvantages.

Both types of computers have used input equipment such as photo-followers or manually scaling x and y coordinate values which are inaccurate and require many time-consuming adjustments.

Analog computers add by using resistor summing networks and multiply with D.C. amplifiers. The inherent inaccuracy and drift of these devices led many people to try digital computers for improved accuracy.

Digital computers generally comprise large and expensive machines which are difficult to program. Mathematical formulas which describe complex curves soon lead to programming and machine time which are prohibitively long and expensive. Furthermore, many very useful curves such as for ship hulls do not lend themselves to any known mathematical analysis. Special purpose digital computers, which are smaller and less expensive, in most instances lack the flexibility to perform a variety of mathematical operations and generally must be designed for the particular operation to be performed.

A primary object of this invention is to disclose a digitized analog computer which will quickly and accurately integrate or multiply one or more variables.

Another object of this invention is to disclose a computer which will measure and calculate the area and the moment of area of any arbitrary curve.

Another object of this invention is to disclose a curve tracer which will generate an output which is an accurate function of an arbitrary curve.

Another object of this invention is to disclose an analog to digital conversion unit which is accurate, simple, and inexpensive to manufacture.

Other objects and advantages of the invention will hereinafter become more fully apparent from the following description of the annexed drawings, which illustrate a preferred embodiment, and wherein:

FIG. 2 illustrates typical waveforms of the type used in the digitized analog computer.

FIG. 4 is a plan view of the curve tracer used with the computer.

FIG. 5 is a detailed view of the curve tracer taken on lines V—V of FIG. 4 looking in the direction of the arrows and showing the X-impulse generator.

Figure 1:
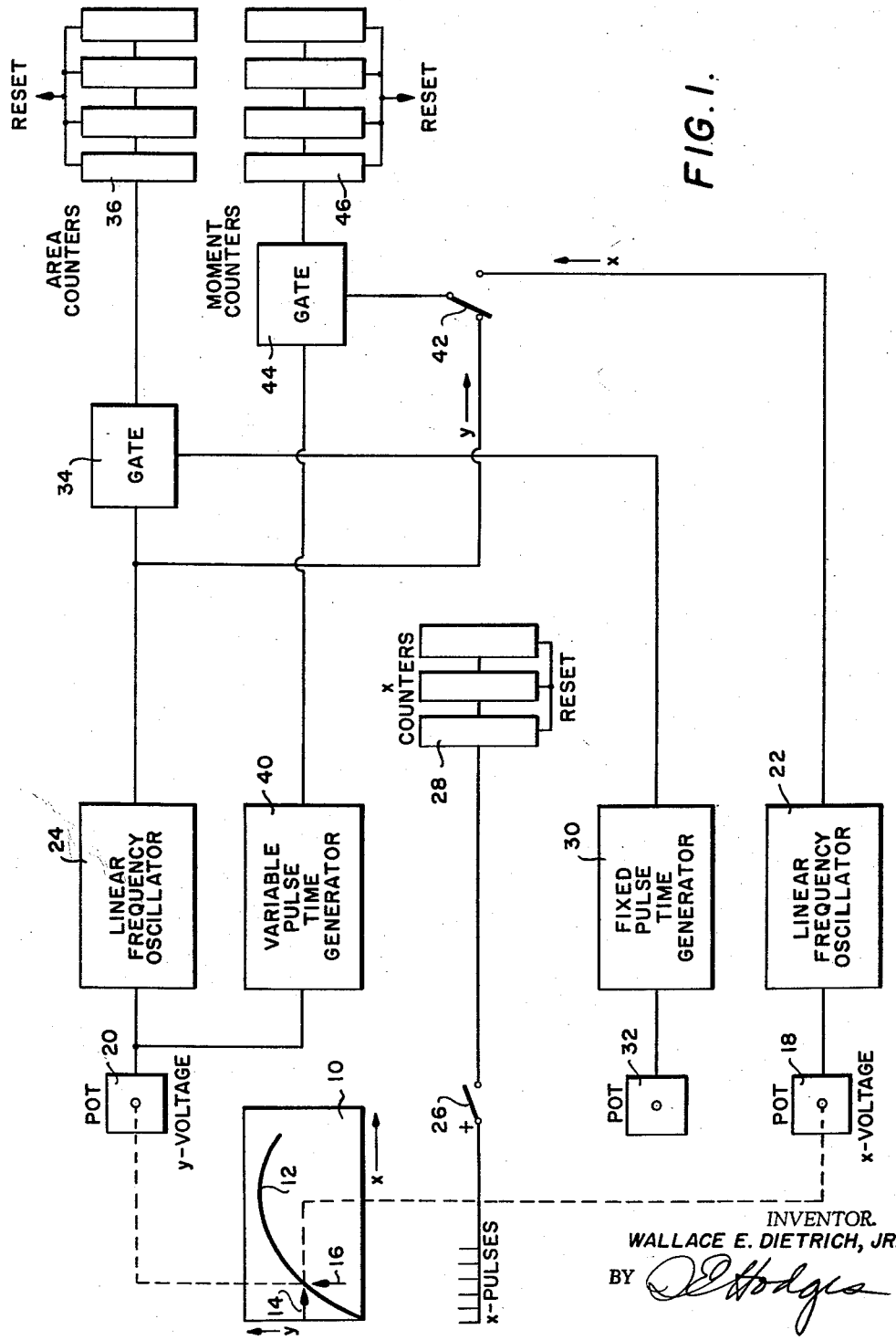
FIG. 1 is a block diagram of the digitized analog computer.

Referring now to the drawings, wherein like reference characters designate like or corresponding parts throughout the several views, there is shown in FIG. 1 (which illustrates a preferred embodiment) a curve tracer 10 having a curve 12 of any arbitrary shape drawn thereon. A set of coordinate axes marked X and Y are shown displaced by a 90° angle.

Two arrows 14 and 16 for the X and Y coordinates, respectively, indicate the position of a tracer point (not shown). In operation, the tracer point is moved by hand along the length of the curve and a pair of potentiometers 18 (for X) and 20 (for Y), which are connected as indicated by the dotted lines from the tracer point, apply a varying D.C. voltage to linear frequency oscillators 22 and 24, respectively.

As the stylus is moved along the curve, a series of X-pulses, spaced 40 to the inch, are generated by a switch 26 which is operated by a ratchet bar (#82, see FIG.5) parallel to the X-axis. These X-pulses, which may be filtered, amplified, etc. by suitable circuitry (not shown) are fed to a set of X-counters 28 where a number proportional to the distance that the stylus is moved along the X-axis is totaled.

The curve tracer 10 is disclosed on FIGS. 4–7 and described further on in the specification.

The varying D.C. voltage from the Y potentiometer 20 is fed to the linear frequency oscillator 24 which generates a plurality of impulses having a frequency proportional to the Y amplitude of the curve 12 and having a constant amplitude.

The X-pulses are also fed to a fixed pulse time generator 30 which generates a series of rectangular pulses having a fixed duration, which duration is set by potentiometer 32, and where each pulse has a constant amplitude.

The outputs of oscillator 24 and generator 30 are fed to area gate 34 where the number of the plurality of impulses from linear oscillator 24 which are generated during the duration of such pulse from the fixed pulse time generator 30 are passed to the area counters 36. Since the number of the plurality of impulses is proportional to Y and the number of pulses from generator 30 is proportional to X, the area counters 36 register a number proportional to the area under the curve 12.

Simplified, illustrative waveforms are shown in FIG. 2 where an arbitrary curve 38 is plotted with respect to axes Y and X. As the tracer point is moved along the curve 38, the output voltage from the potentiometer 20 varies the output of the linear frequency oscillator 24 in a fashion indicated by the number 24 on FIG. 2. At the same time a series of pulses having a fixed duration from the fixed pulse time generator 30, as indicated by 30 on FIG. 2, are generated. Area gate 34 passes the positive peaks of the impulses from oscillator 24 which are generated during the duration of each pulse from generator 30 as indicated by number 34 on FIG. 2 and which are registered on area counters 36 as shown by number 36 on FIG. 2, where the sum is 9 units.

This sum of 9 units is not exactly the area under the curve, but a mathematical approximation to the correct value could be made by using Simpson's rule or other mathematical approximations. If a sufficiently large number of X pulses are generated or the rate of change of the value of Y from one X pulse to the next is small, the total on the area counter 36 will, after proper calibration, register the correct value of the area. In this case, as described above, a value of 40 pulses per inch of X distance was used.

In actual practice somewhat more convenient values are used. Suppose a square area of 10 inches by 10 inches is desired to be measured. Oscillator 24 will vary from 100 c.p.s. at $Y=0$ to 100 k.c. at $Y=10$. There will be 40 pulses per inch times 10 inches equals 400 pulses generated by the X pulse generator 30. If one-second X pulses are generated, area counter 36 will total 400 times 100 kc. equals $40 \times 10^6$, after the tracer point is moved across the 10 x 10 area. In addition, a time of 400 seconds would be required for this operation.

In order to achieve the proper total, area counter 36 could be divided by $$100/40 \times 10^6 = \frac{1}{4 \times 10^5}$$

It has been found more convenient to reduce the duration of the one-second X pulses from generator 30 by means of potentiometer 32 by a factor of $$\frac{1}{4 \times 10^2}$$

In this case each X pulse will have a duration of 2.5 milliseconds and the area counters 36 will read 100,000 which is divided by a factor of 1000 to give the true value of 100. In addition the tracer point may be moved very rapidly so that a total real time of 400 times 2.5 milliseconds equals one second is all that is needed for the measurement and calculation of the 10 x 10 area.

Other measurements such as the moment of the area with respect to the X axis may be made by feeding the Y potentiometer 20 output to a variable pulse time generator 40, which generates a pulse initiated by switch 26, which pulse has a duration proportional to Y and a constant amplitude. The output of generator 40 and the output of oscillator 24 (by means of switch 42) are fed to moment gate 44 and the number of impulses from oscillator 24 generated during the duration of each of the series of pulses from generator 40 is totaled on moment counters 46.

As indicated on FIG. 2, the variable duration pulse is shown at 40 and a total proportional to the moment of area of 29 is shown at 46. Oscillator 24 has an output frequency proportional to Y and generator 40 has a frequency output proportional to X and a time duration proportional to Y so that the moment counters 46 read a value proportional to YYX or $Y^2 \Delta X$ which is proportional to the moment of area with respect to the X axis.

The correct equation is $$\sum_0^x \frac{Y^2}{2} \Delta X$$

so that the value 29 should be divided by 2 or be 14.5, which value is more nearly the correct moment of area of the example shown in FIG. 2.

The moment of area with respect to the Y axis, which is proportional to $XY \Delta X$, may be obtained by placing switch 42 in the other position to connect moment gate 44 to linear frequency oscillator 22. Calibration of the moment counters 46 may be performed by adjusting the duration of the pulse from the variable pulse time generator 40 or by varying the frequency of the oscillators 22 and 24 as described in connection with the area counter 36.

Since the output of area gate 34 is a quantitative measure of the value of Y for successive values of X, the slope of the curve or the differential may be obtained by subtracting successive or any two values of Y. The output of the area gate 34 is in the form of $Y_1+Y_2+Y_3 \ldots Y_n$ and subtracting $Y_1$ from $Y_2$ and dividing by $\Delta X$ results in the slope of the curve between these two points. Suitable memory circuits and subtracting counters may be necessary as is well known to those skilled in the art.

Figure 3:
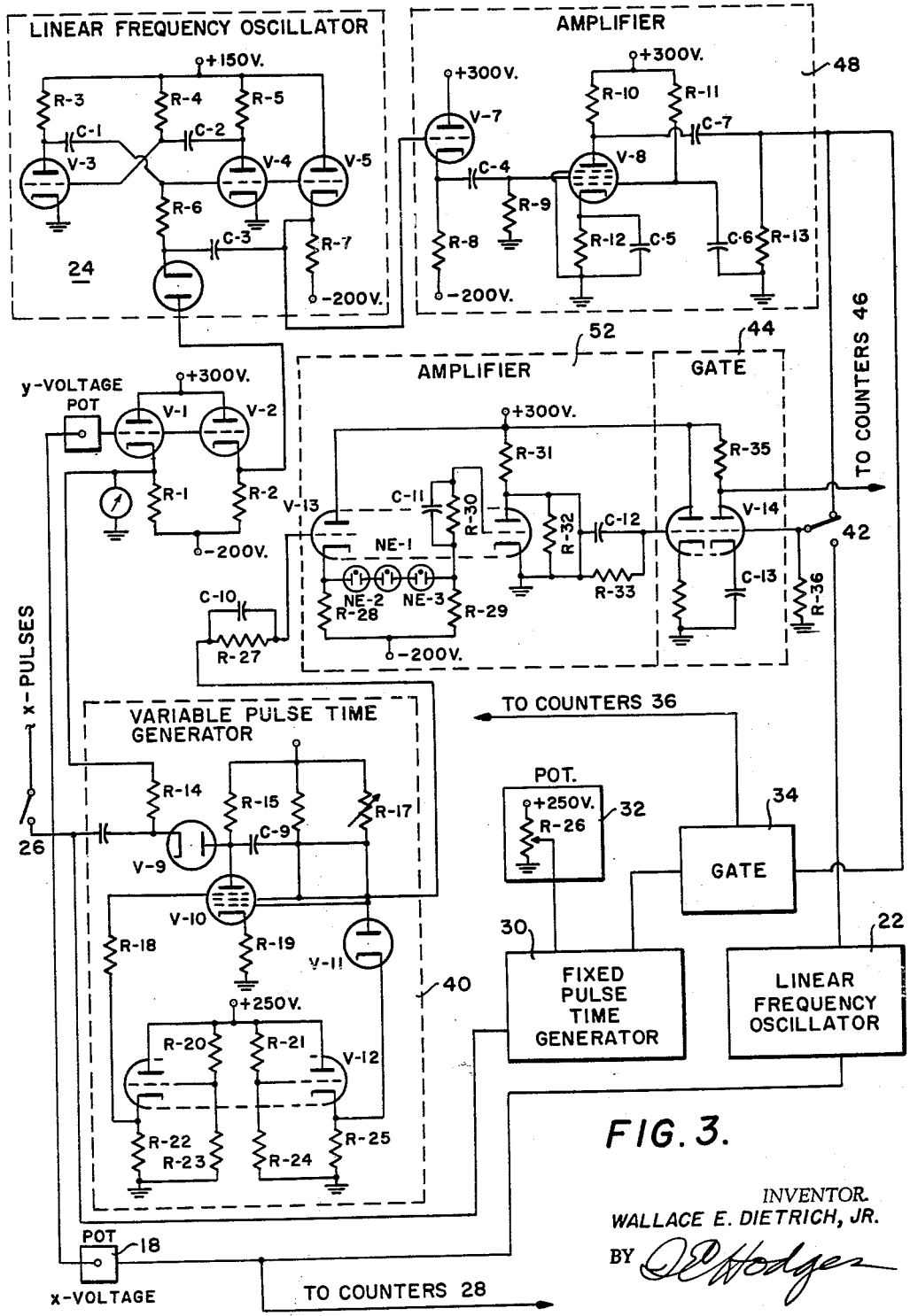
FIG. 3 is a schematic diagram, partly in block form, of the computer.

A particular circuit for performing the functions of the elements in FIG. 1 is shown in FIG. 3, partly in block form. The Y potentiometer 20 passes its output to cathode follower V2 where from one half of the tube the signal passes to linear frequency oscillator 24. Oscillator 24 is a free-running multivibrator type having feedback from the grid of V4 through cathode follower V5 and condenser C3 to resistor R6. The charging of condenser C3 by means of diode V6 varies the cut-off time of V4 and thereby linearizes the output frequency of oscillator 24 with respect to the input voltage from V1 in addition to the simple variation of the cut-off time by the voltage fed from V1 through V6.

The output of oscillator 24, which is an alternating frequency having sharp peaks, is fed to amplifier 48 comprising cathode follower V7 and pentode amplifier V8. The positive peaks of the output of oscillator 24 are clipped by the grid circuit of V8 and the negative peaks are amplified, inverted, and sent to area gate 34 and to switch 42.

The output of V1 is sent to variable pulse time generator 40 and to calibrating meter 50, which will enable generator 40 to be set by R17 to various values depending on the area under the curve 38 and the necessary scale factors which are used in ship design. Generator 40 is a phantastron circuit for generating a variable pulse width similar to that described in "The Phantastron" by Wm. L. Roberts, Radio Engineering, November 1954, pp. 12–14. Cathode follower tube V12 and associated circuit provides a low impedance, reference voltage source for the control and suppressor grids of V10.

The X pulses from switch 26 come in through condenser C8 and act to trigger generator 40 for a length of time proportional to the voltage from potentiometer 20 via V1 and R14. The output pulse of generator 40 is sent to amplifier 52 having cathode follower-amplifier tube V13. Three neon tubes, NE1, NE2, and NE3 at the output of the cathode follower act to square the output pulse up by ionizing and de-ionizing at particular input voltages.

The amplified and inverted variable time pulse is then sent to moment gate 44 where the left hand section of V14 is normally conducting heavily and keeps the right hand section from passing any of the Y or X pulses, by means of the common cathode connection, until the negative pulse from generator 40 allows the right hand section to operate as an amplifier to the X or Y pulses.

The fixed pulse time generator 30 is similar to variable pulse generator 40 except that the equivalent R14 resistor goes to a variable potentiometer R26, which is set to a particular value during a computation instead of being continuously variable.

Linear frequency oscillator 22 is similar to linear frequency oscillator 24 and the area gate 34 is similar to moment gate 44 and therefore these units are shown in block form. The area and moment counters 36 and 46 are Berkeley Counters 705A by Beckman Instruments, of Richmond, California.

In this particular embodiment the voltage values are as shown in the drawings and the circuit values are as follows:

| | |
|---|---|
| V12 | 12AU7. |
| V1, 2, 3, 4, 5, 7 | ½-12AU7. |
| V6, 9, 11 | ½-6AL5. |
| V8 | 6BA6. |
| V10 | 6AS6. |
| V13, 14 | 5963. |
| R1, 2 | 150K ohms. |
| R3, 5 | 36K ohms. |
| R4 | 330K ohms. |
| R18 | 27K ohms. |
| R19 | 4.7K ohms. |
| R23, 25 | 20K ohms. |
| R24 | 39K ohms. |
| R28 | 390K ohms. |
| R32, 6, 17, 29 | 1 megohm. |
| R30, 26, 7, 13, 27 | 100K ohms. |
| R8, 20, 21 | 270K ohms. |
| R9 | 62K ohms. |
| R10 | 15K ohms. |
| R34, 31, 11, 14 | 47K ohms. |
| R12 | 68 ohms. |
| R15, 33 | 470K ohms. |
| R16, 22 | 10K ohms. |
| C1, 13 | .001 microfarad. |
| C2 | 10 micro-micro-farads. |
| C3 | .1 microfarad. |
| C4 | 47 micro-micro-farads. |
| C5 | 25 microfarads. |
| C6 | 4 microfarads. |
| C7 | .15 microfarad. |
| C8 | 270 micro-micro-farads. |
| C9 | .066 microfarad. |
| C10–12 | 20 micro-micro-farads. |
| NE1, 2, 3 | NE51. |
| Meter 50 | Triplett model 227–T, 0–50 microamps. with series resistors calibrated for 0–1–5–10–100 volts. |

Referring to FIG. 4, a plan view of the curve tracer 10 is shown having an aluminum base plate 56 which is approximately square of about 30 inches on a side and being ⅜ inch thick. A pair of aluminum supports 58 are mounted at two adjacent corners of the base plate 56. Each support has a hole 60 for mounting a ½ inch diameter stainless steel smooth shaft 62 and a hole 64 for mounting a ½ inch diameter stainless steel ratchet bar 66, which bar has a grooved surface of 40 threads per inch cut thereon.

An X coordinate carriage 68 made of aluminum is shown comprising a hexagonal sleeve 70, a tracer wheel 72 driving a potentiometer 18, and an X carriage rail unit 76 between the sleeve 70 and the wheel 72.

Figure 6:
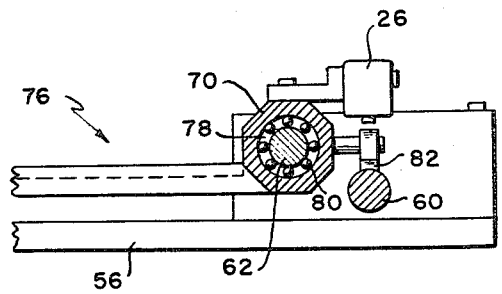
FIG. 6 is a view, partly in section, taken on the line VI—VI of FIG. 4 looking in the direction of the arrows and showing the X-coordinate carriage slide and supports.
Figure 7:
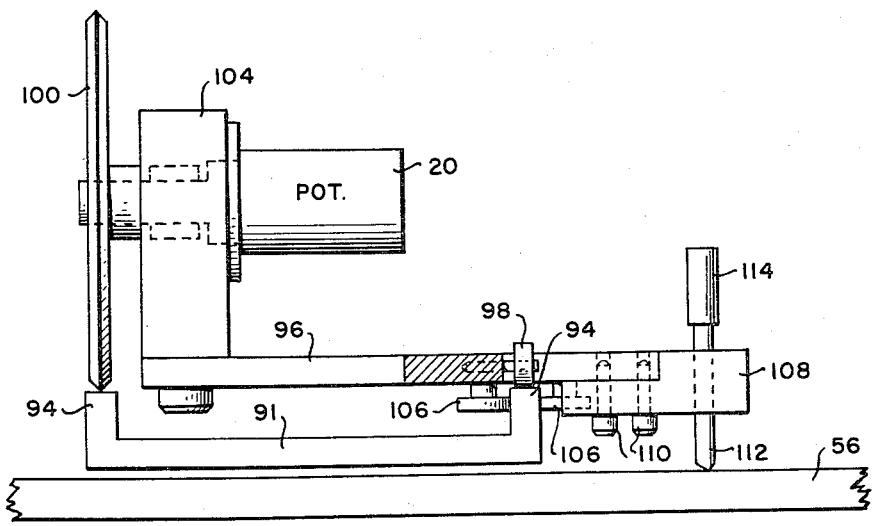
FIG. 7 is a view, partly in section, taken along the lines VII—VII of FIG. 4 looking in the direction of the arrows and showing the Y-coordinate carriage.

Referring also to FIG. 6, the sleeve 70 has a central hole 78 having a pair of ball bearings 80 mounted therein which run smoothly on shaft 62.

Referring also to FIG. 5, a stainless steel pawl 82 having a sharpened end 84, which is intermittently operated by ratchet bar 66, is pivotally mounted on the sleeve 70 by pin 85. An operating end 86 of pawl 82 operates a microswitch 26 which is attached to sleeve 70 to produce a series of X pulses as the X carriage is moved along shaft 62.

Referring to FIG. 4, the X potentiometer 18 is attached to a bracket 88 mounted on X carriage rail unit 76, which also allows the potentiometer shaft to be connected to the tracer wheel 72. Wheel 72, which has a sharp beveled edge to cut through dust and dirt and not ride up and down, rolls on a rail 90 mounted on the lower edge of the base plate 56. The potentiometer 18 is a 3 turn Helipot, Series C of 50,000 ohms made by the Beckman Instruments, Inc. of Richmond, California.

The X carriage rail unit 76 comprises a central section 91 having a number of lightening holes 92, which section 91 is integral with a pair of Y carriage rails 94 which extend across the base plate 56.

A Y carriage 96 moves along the Y carriage rails 94 on a pair of rollers 98 and on a tracer wheel 100, which wheel also drives a Y potentiometer 20 supported by a bracket 104 on carriage 96. Y potentiometer 20 is a 50,000 ohm potentiometer, #85196.01J by G. M. Giannini and Co., East Orange, N.J. A plurality of rollers 106 are mounted on the Y carriage 96 with their axes at right angles to one of the carriage rails 94 and on each side thereof. These rollers 106 press against the rail 94 from each side and prevent any transverse movement of the Y carriage unit 96 with respect to the X carriage 68 as is more clearly illustrated in FIG. 7.

Again referring to FIG. 7, a tracer point holder 108 made of a clear plastic such as methyl methacrylate, sold under the tradename of "Lucite" is attached to the Y carriage 96 by means of screws 110. A stainless steel tracer point 112 having a handle 114 is placed in a hole drilled in the holder 108.

In operation the X carriage 68 is moved to the left of the curve 12 and the Y carriage 96, which is mounted on the X carriage 68, is moved below the curve 12. The tracer point 112 is placed at the lower left hand corner of the curve and moved by hand along the curve 12. The tracer point moves the Y carriage along the Y carriage rails 94 and moves the X carriage 68 to the right by means of rollers 106. An X pulse output is obtained from the microswitch 26 and the X and Y potentiometers generate appropriate outputs for the digitized analog computer.

The curve 12 may be made to a convenient scale such as ¼" equals 1 foot for ship hull design.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

A manual curve tracer for a digitized analog computer comprising a base plate for mounting a curve whose characteristics are to be measured; a pair of supports mounted on said base plate; a supporting shaft having its ends mounted on said supports; an X-coordinate carriage comprising a sleeve slidably mounted on said supporting shaft, a carriage track having a pair of rails attached by one end to said sleeve and extending across said base plate to the other end, a potentiometer mounted at said other end of said track for generating an output proportional to the distance said X-coordinate carriage is moved across said base plate along a first coordinate axis and a first tracer wheel connected to said potentiometer and rollable on said base plate; a Y-coordinate carriage mounted on said carriage track and having a plurality of rollers rollable on one rail of said track, a Y potentiometer for generating an output proportional to the value of said curve along a second coordinate axis, a second tracer wheel connected to said Y potentiometer and rollable along the other rail of said track, and a tracer point connected to said Y-coordinate carriage for following said curve; a ratchet bar comprising a threaded shaft having its ends mounted on said supports; a ratchet pawl mounted on said sleeve for cooperation with said ratchet bar; and means for generating a series of impulses proportional to the distance said X coordinate carriage is moved along said first axis comprising a switch mounted on said sleeve responsive to the movement of said pawl.

References Cited by the Examiner

UNITED STATES PATENTS

| | | | |
|---|---|---|---|
| 2,584,267 | 2/52 | Hayek | 33—1 X |
| 2,614,327 | 10/52 | Russell | 33—1 |
| 2,623,936 | 12/52 | Kennedy et al. | 33—1 |
| 2,948,580 | 8/60 | Eisenstark | 33—1 |
| 2,999,315 | 9/61 | Bensen | 33—1 |
| 3,026,766 | 3/62 | Preston | 33—1 |

ISAAC LISANN, *Primary Examiner.*